United States Patent
Yamashita et al.

(10) Patent No.: US 6,832,451 B2
(45) Date of Patent: Dec. 21, 2004

(54) WEATHER STRIP FOR USE ON A SUNROOF

(75) Inventors: Takashi Yamashita, Hiroshima (JP); Masayuki Daio, Hiroshima (JP); Masaharu Ohnishi, Wako (JP); Hirofumi Yamane, Wako (JP); Tatsuaki Uehara, Tochigi-ken (JP); Koichi Hotta, Tochigi-ken (JP)

(73) Assignees: Nishikawa Rubber Co., Ltd., Hiroshima-ken (JP); Honda Giken Kogyo Kabushiki Kaisha, Tokyo (JP); Yachiyo Kogyo Kabushiki Kaisha, Saitama-Ken (JP)

( * ) Notice: Subject to any disclaimer, the term of this patent is extended or adjusted under 35 U.S.C. 154(b) by 0 days.

(21) Appl. No.: 10/358,712

(22) Filed: Feb. 5, 2003

(65) Prior Publication Data

US 2003/0177701 A1 Sep. 25, 2003

(30) Foreign Application Priority Data

Mar. 20, 2002 (JP) .......................................... 2002-077867

(51) Int. Cl.$^7$ ................................................. E06B 7/22
(52) U.S. Cl. ................................. 49/498.1; 296/216.09; 49/489.1
(58) Field of Search ............................ 49/475.1, 489.1, 49/492.1, 498.1; 296/93, 154, 216.09

(56) References Cited

U.S. PATENT DOCUMENTS

| | | | | |
|---|---|---|---|---|
| 3,137,900 A | * | 6/1964 | Carbary | 49/478.1 |
| 5,806,914 A | * | 9/1998 | Okada | 296/146.9 |
| 6,227,634 B1 | * | 5/2001 | Cittadini et al. | 312/296 |

* cited by examiner

Primary Examiner—Jerry Redman
(74) Attorney, Agent, or Firm—Flynn, Thiel, Boutell & Tanis, P.C.

(57) ABSTRACT

There is provided a weather strip for use on a sunroof which can be firmly built in a seal holder even if there occur variations in molding dimensions. The weather strip comprises a thicker base part which is engaged in a built-in recess of the seal holder fixed to a roof glass, a hollow seal part which elastically contacts a roof panel, and a thinner barrel part which is integrally formed between the thicker base part and the hollow seal part and is clamped by an upper protrusion part and a lower protrusion part which are formed in the built-in recess to protrude therein, wherein a continuous angle between an upper surface of the thinner barrel part and the hollow seal part and that between a lower surface of the thinner barrel part and the hollow seal part are set 90° respectively, and an ascent slope is formed on the upper surface of the thinner barrel part and ascends aslant from the hollow seal part toward the thicker base part, and a descent slope is formed on the lower surface of the thinner barrel part and descends aslant from the hollow seal part toward the thicker base part.

10 Claims, 2 Drawing Sheets

WEATHER STRIP FOR USE ON A SUNROOF

FIELD OF THE INVENTION

The invention relates to a weather strip for use on a sunroof of a car so as to ensure sealing property between a roof panel and a roof glass.

BACKGROUND OF THE INVENTION

A conventional weather strip for use on a sunroof is described now with reference to FIGS. 1 and 2.

A weather strip 20 is provided on a sunroof of a car for ensuring sealing property between a roof panel 14 and a roof glass 15 and is built in a seal holder 9 fixed to an outer peripheral end of the roof glass 15. The weather strip 20 comprises a thicker base part 21, a thinner barrel part 22 and a hollow seal part 23. The seal holder 9 has a recess 10 in which the weather strip 20 is built in (hereinafter referred to as built-in recess 10) at the outer peripheral end, and has an upper protrusion part 11 and a lower protrusion part 12 on its opening edge.

With the weather strip 20 having such a configuration, the thicker base part 21 is engaged in the built-in recess 10 of the seal holder 9 while the thinner barrel part 22 is clamped by the upper protrusion part 11 and the lower protrusion part 12, whereby the weather strip 20 is built in the seal holder 9, thereby allowing the hollow seal part 23 to elastically contact the roof panel 14.

A continuous angle θ between the hollow seal part 23 and the thinner barrel part 22 of the weather strip 20 is set to be 90° or more. Accordingly, a sectional shape of the thinner barrel part 22 is flat and substantially uniform in an entire thickness, or it is tapered as the upper and lower surfaces thereof are beveled in the direction from the hollow seal part 23 to the thicker base part 21.

With the conventional weather strip 20 having such a configuration, if there do not occur variations in molding dimensions of the weather strip 20 and the seal holder 9, the weather strip 20 can be built in the seal holder 9 at a set position. Accordingly, a high sealing property can be ensured without any problems.

However, if there occur variations in molding dimensions of the weather strip 20 and the seal holder 9, built-in posture of the weather strip 20 relative to the seal holder 9 becomes unstable, causing a problem that sealing property becomes worsened. This problem occurs to a liner part 30. But if it occurs to a cornered part 40, it causes a more serious problem because it is harder to fit the weather strip 20 along the curved portions of the seal holder 9.

SUMMARY OF THE INVENTION

The invention has been developed to solve the foregoing problems and it is an object of the invention to provide a weather strip for use on a sunroof capable of firmly building the weather strip 1 in the seal holder 9 with a stabilized posture even if there occur variations in molding dimensions of the weather strip 20 and the seal holder 9, thereby ensuring high sealing property.

A weather strip for use on a sunroof of a car according to a first aspect of the invention ensures sealing property between a roof glass 15 and a roof panel 14. The roof glass 15 is mounted on the sunroof of the car and has a seal holder 9 fixed to an outer peripheral end thereof and a built-in recess 10 provided on an outer peripheral end of the seal holder 9. The weather strip 1 comprises a thicker base part 2 to be engaged in the built-in recess 10, a hollow seal part 3 elastically contacting an opening end of the roof panel 14. A thinner barrel part 5 is integrally formed between the thicker base part 2 and the hollow seal part 3. The thinner barrel part 5 is clamped by an upper protrusion part 11 formed on an upper part of an opening edge of the built-in recess 10 and a lower protrusion part 12 formed on a lower part of the opening edge of the built-in recess 10. The thinner barrel part 5 is formed such that a continuous angle θ between an upper surface of the thinner barrel part 5 and the hollow seal part 3 and between the lower surface of the thinner barrel part 5 and the hollow seal part 3 are both set less than 90°, forming the upper surface an ascent slope 6 which inclines in the direction from the hollow seal part 3 toward the thicker base part 2, while forming the lower surface a decent slope 7 which declines in the same direction.

The weather strip for use on a sunroof according to a second aspect of the invention is characterized in further comprising a hook part 13 protruding aslant from the lower end of the thicker base part 2 toward the lower protrusion part 12.

PREFERRED EMBODIMENT OF THE INVENTION

Figure 1:
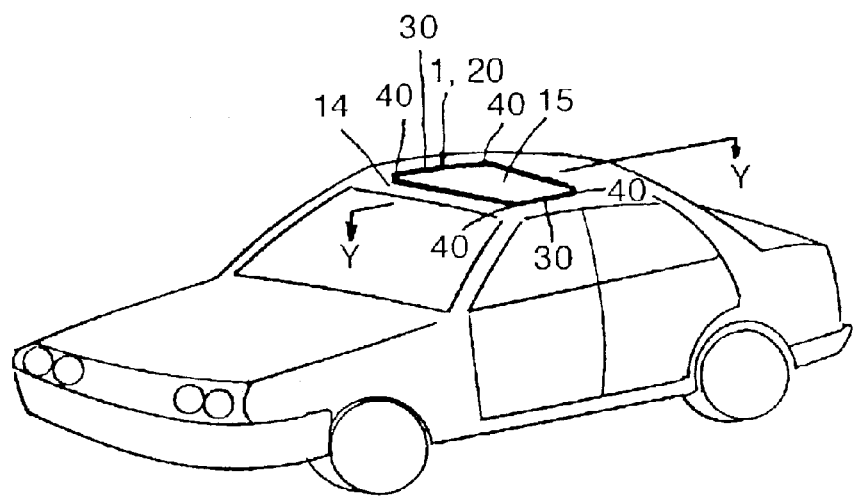
FIG. 1 is a perspective view of a car provided with a sunroof.
Figure 2:
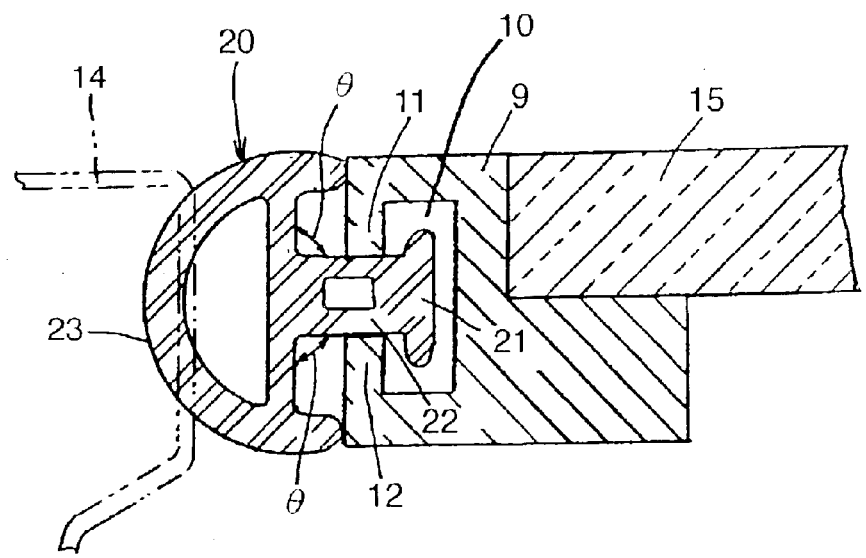
FIG. 2 is a partially enlarged sectional view of a conventional weather strip for use on a sunroof taken along line Y—Y in FIG. 1.
Figure 3:
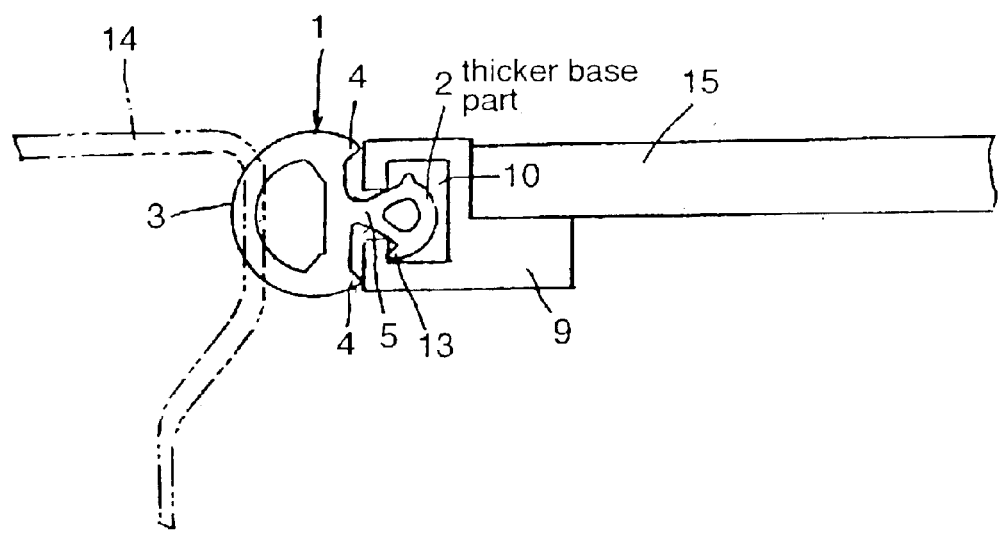
FIG. 3 is a sectional view of a weather strip for use on a sunroof of the invention taken along line Y—Y in FIG. 1.
Figure 4:
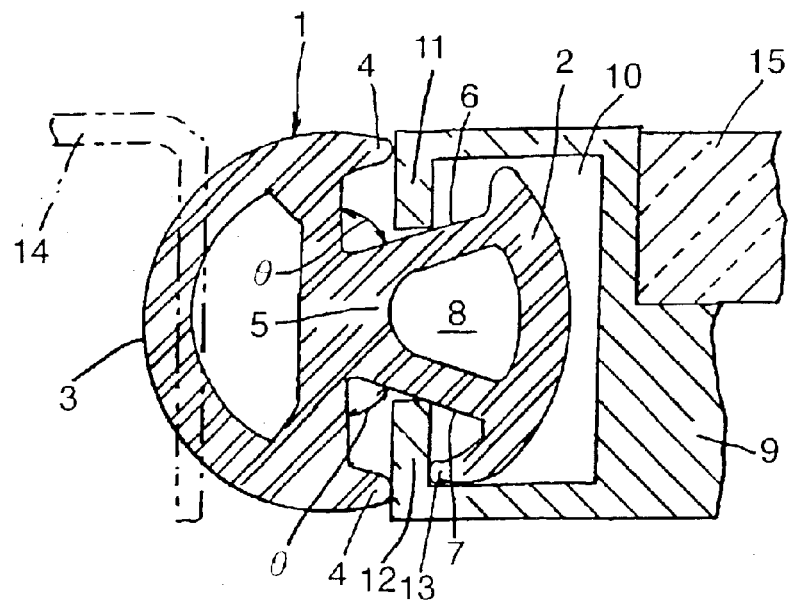
FIG. 4 is a partially enlarged sectional view of the weather strip for use on a sunroof of the invention taken along line Y—Y in FIG. 1.

A preferred embodiment of a weather strip 1 according to the invention is now described with reference to FIGS. 1, 3 and 4.

The weather strip 1 is provided for ensuring sealing property between a roof glass 15 to be mounted on a sunroof of a car and a roof panel 14, and it comprises a thicker base part 2, a hollow seal part 3 and a thinner barrel part 5.

The thicker base part 2 is engaged in a built-in recess 10 provided on an outer peripheral end of a seal holder 9 which is fixed to an outer peripheral end of the roof glass 15. The hollow seal part 3 makes an elastic contact with the roof panel 14 for sealing that area. The hollow seal part 3 has lip parts 4, 4 which are provided at the upper and lower parts thereof and protrude respectively for stabilizing the built-in posture of the weather strip 1 against the seal holder 9 for enhancing sealing property. The thinner barrel part 5 is integrally formed between the thicker base part 2 and the hollow seal part 3 and is clamped by an upper protrusion part 11 and a lower protrusion part 12, which are provided to protrude at the upper and lower parts of an opening end of the built-in recess 10. A hollow part 8 is formed in the thinner barrel part 5 for enhancing elasticity thereof and for obtaining a tighter contact with the upper protrusion part 11 and the lower protrusion part 12.

A continuous angle θ between an upper surface of the thinner barrel part 5 and the hollow seal part 3 and between a lower surface of the thinner barrel part 5 and the hollow seal part 3 are set to be 75° respectively. By arranging so, the upper surface of the thinner barrel part 1 forms an ascent slope 6 which inclines in the direction from the hollow seal part 3 toward the thicker base part 2, while the lower surface of the thinner barrel part 1 forms a descent slope 7 which declines in the same direction. The continuous angle θ is not limited to the specific numeral as indicated above but is preferably arranged in between 70° to 80°. The thicker base part 2 has a hook part 13 which protrudes aslant from the lower end thereof to the lower protrusion part 12.

With the weather strip 1 having such a configuration, since the ascent slope 6 and the descent slope 7 are formed on the thinner barrel part 5, if an interval between the upper protrusion part 11 and the lower protrusion part 12 of the seal holder 9 is more widened than a set interval due to variations in molding dimensions, the weather strip 1 is allowed to approach the roof panel 14 so that the weather strip 1 can be firmly built in the seal holder 9. Since the ascent slope 6 is formed on the upper surface of the thinner barrel part 5 and the descent slope 7 is formed on the lower surface of the thinner barrel part 5, if the weather strip 1 is allowed to approach the roof panel 14 to some extent, the ascent slope 6 and the descent slope 7 are strongly clamped by the upper protrusion part 11 and the lower protrusion part 12 from the above and below, and hence the weather strip 1 is firmly built in the seal holder 9 with a stabilized posture. This is also applied to a case where the thickness of the thinner barrel part 5 of the weather strip 1 becomes thinner than a set thickness due to variations in molding dimensions.

Since the hook part 13 protrudes from the lower end of the thicker base part 2, the hook part 13 is retained by the lower protrusion part 12 so that the built-in force of the weather strip 1 relative to the seal holder 9 is strengthened. Accordingly, the weather strip 1 is attached to the seal holder 9 with a stabilized posture so that sealing property of the weather strip 1 relative to the roof panel 14 and that relative to the seal holder 9 are improved respectively. This is applied not only to a linear part 30 but also to a cornered part 40 so that a built-in posture is stabilized with a strong built-in force.

The hook part 13 does not always elastically contact the lower protrusion part 12. For example, if an interval between the upper protrusion part 11 and the lower protrusion part 12 is narrower than a set value or the thickness of the thinner barrel part 5 is thicker than the set value, the weather strip 1 is built in the seal holder 9 while it is slightly allowed to approach the seal holder 9 from a predetermined position, so that there produces a gap between the hook part 13 and the lower protrusion part 12. In such a case, the thinner barrel part 5 is strongly clamped by the upper protrusion part 11 and lower protrusion part 12, and hence the built-in posture becomes stabilized.

With the weather strip 1 having such a configuration, since the hook part 13 is formed only on the lower end of the thicker base part 2 but not formed on the upper end thereof, the weather strip 1 can be easily built in the seal holder 9. That is, when the weather strip 1 is built in the seal holder 9 at the built-in recess 10, it can be easily built in the build-in recess 10 by inserting the thicker base part 2 into the built-in recess 10 of the seal holder 9 from the upper end of the thicker base part 2 where the hook part 13 is not formed. However, if the hook part 13 is also formed to protrude on the upper end of the thicker base part 2, the hook part 13 becomes obstructive, making it difficult to insert the thicker base part 2 into the built-in recess 10.

According to the weather strip 1 of the first aspect of the invention, since the ascent slope 6 and descent slope 7 are formed on the thinner barrel part 5, the weather strip 1 can be firmly built in the seal holder 9 even if there occur variations in molding dimensions thereof even at the cornered part 40 as well as the linear part 30. Accordingly, sealing property can be enhanced not only between the weather strip 1 and the roof panel 14 but also between the weather strip 1 and the seal holder 9.

According to the weather strip 1 of the second aspect of the invention, since the hook part 13 protrudes from the lower end of the thicker base part 2, the hook part 13 is retained by the lower protrusion part 12 so that a built-in force of the weather strip 1 relative to the seal holder 9 is strengthened, and the weather strip 1 can be built in the seal holder 9 with stabilized posture. Accordingly, sealing property is further enhanced.

The disclosure of Japanese Patent Application No. 2002-077867 filed Mar. 20, 2002 including specification, claims, and drawings, is incorporated herein by reference.

What is claimed is:

1. A weather strip for use on a sunroof of a car for ensuring sealing between a roof glass and a roof panel, said roof glass being mounted on the car and having a seal holder fixed to an outer peripheral end thereof and a built-in recess being provided on an outer peripheral end of the seal holder, said weather strip being interposed between the roof glass and the roof panel and comprising:

a thickened base part to be engaged in the built-in recess;

a hollow seal part having a surface with an elliptical share for elastically contacting an end of the roof panel;

and a thinned barrel part integrally formed with the thickened base part and the hollow seal part and located between an upper protrusion part formed on an upper part of an opening edge of the built-in recess and a lower protrusion part formed on a lower part of the opening edge of the built-in recess;

wherein a first continuous angle between an upper surface of the thinned barrel part and the hollow seal part and a second continuous angle between a lower surface of the thinned barrel part and the hollow seal part are set to be less than 90° respectively, and an ascent slope is formed on the upper surface of the thinned barrel part and ascends aslant from the hollow seal part toward the thickened base part, and a descent slope is formed on the lower surface of the thinned barrel part and descends aslant from the hollow seal part toward the thickened base part.

2. The weather strip for use on a sunroof according to claim 1, further comprising a hook part protruding aslant from a lower end of the thickened base part toward the lower protrusion part.

3. A weather strip for use on a sunroof for ensuring a seal between a roof panel and a roof glass, the roof glass including a seal holder fixed at a peripheral end thereof, the seal holder having a built-in recess opening outwardly away from the roof glass, the weather strip for mounting in the built-in recess of the seal holder comprising:

a thickened base part having projecting extensions conforming to upward and downward projecting extensions when received within the seal holder;

a hollow seal part having an elliptical shaped surface at an outward end thereof for contacting an end of a roof panel and including a hollow section therein; and a thinned barrel part formed between and monolithic with the thickened base part and the hollow seal part, the thinned barrel part having a first end connected to an inward end of the hollow seal part and a second end including first and second arms joined to the thickened base part, and a hollow section formed in the thinned barrel part and closed by said thickened base part, a cross section of said thinned barrel part and said hollow seal part being symmetric about a central dividing plane, the central dividing plane being oriented substantially parallel to a roof glass plane defined by an outer surface of the roof glass near the seal holder, said thinned barrel part defining a first continuous angle between an outward direction transverse to the dividing plane and an upper outer face of the first arm that is less than 90 degrees so that the first arm forms an ascent slope along an upper surface of the first arm that extends toward said thickened base part, the thinned barrel part defining a second continuous angle between an outward direction transverse to the dividing plane and a lower outer face of the second arm that is less than 90 degrees so that the second arm forms a descent slope along a lower surface of the second arm that extends toward said thickened base part.

4. The weather strip according to claim 3, wherein the downwardly projecting extension of the thickened base part comprises a hook element extending downwardly a distance greater than the upwardly projecting extension for contacting a sidewall of the seal part.

5. The weather strip according to claim 3, wherein the hollow seal part comprises upwardly and downwardly extending surfaces transverse to the dividing plane where the hollow part joins the thinned barrel part.

6. The weather strip according to claim 3, wherein said arms of said thinned barrel part have a substantially constant width along the length thereof.

7. The weather strip according to claim 3, wherein the hollow seal part includes lip parts at respective upward and downward sides thereof projecting rearwardly for contacting upper and lower protrusions of the seal holder at upper and lower outer edges thereof.

8. The weather strip according to claim 3, wherein the extensions of said thickened base part project outwardly beyond where said first and second arms join said thickened base part.

9. A combination comprising:
 a roof panel for a car;
 a sunroof for a car, the sunroof comprising:
  a roof glass;
  a seal holder having a built-in recess on an outer peripheral side, the seal holder receiving an outer peripheral end of the roof glass at an inner side thereof, and
  a weather strip positioned in the built-in recess of the seal holder and projecting outwardly toward said roof panel, the weather strip comprising:
   a thickened base part oriented within the built-in recess, the thickened base part having upwardly and downwardly projecting extensions;
   a hollow seal part having an elliptical shaped surface at an outward end thereof for contacting an end of the roof panel; and
   a thinned barrel part integrally formed between and joining the thickened base part and the hollow seal part, the thinned barrel part having a first continuous angle defined by an upward direction transverse to a length of the weather strip and an upwardly extending upper surface of the thinned barrel part that is less than 90 degrees and forms an ascending slope on the upper surface extending toward the thickened base part, the thinned barrel part having a second continuous angle between a downward direction transverse to the length of the weather strip and a downwardly extending lower surface of the thinned barrel part that is less than 90 degrees and forms a descending slope on the lower surface of the thinned barrel part extending toward the thickened base part, the thinned barrel part being located between an upper protrusion part formed at an upper part of an opening edge of the built-in recess and a lower protrusion part formed at a lower part of the opening edge of the built-in recess,
  wherein the elliptical shaped surface at an outward end of said seal part, the ascending and descending slopes of the thinned barrel part and the upwardly and downwardly projecting extensions of the thickened base part enable the weather strip to contact a roof panel while moving in a direction substantially transverse to the end of the roof panel,
  wherein the weather strip is interposed against the roof panel when the sunroof is closed, the sunroof being capable of moving upwardly and substantially transverse to an end of the roof panel to open and being capable of moving downwardly and substantially transverse to the end of the roof panel to close the sunroof, and
  wherein the ascending and descending slopes of the thinned barrel part maintain the weather strip position so that the upwardly and downwardly projecting extensions of the thickened base part do not contact the upper protrusion part or the lower protrusion part of the built-in recess.

10. The combination of claim 9, wherein the downwardly projecting extension of the thickened base part comprises a hook element extending downwardly a distance greater than the upwardly projecting extension.

* * * * *